United States Patent [19]

Favret, Jr.

[11] 4,372,757
[45] Feb. 8, 1983

[54] OFFSHORE PLATFORM DECK DRAINAGE

[76] Inventor: Uncas Favret, Jr., Rte. 3, Box 3880, Covington, La. 70433

[21] Appl. No.: 228,729

[22] Filed: Jan. 27, 1981

[51] Int. Cl.³ .............................................. B01D 19/00
[52] U.S. Cl. ........................................ 55/46; 55/160; 55/172; 210/117; 210/120
[58] Field of Search ............... 210/747, 800, 804, 117, 210/120, 153, 170, 163; 55/46, 52, 172, 176, 160

[56] References Cited

U.S. PATENT DOCUMENTS

| | | | |
|---|---|---|---|
| 870,027 | 11/1907 | Gross | 210/163 |
| 1,457,637 | 6/1923 | Sievers | 210/163 X |
| 1,498,069 | 6/1924 | Beatsch | 55/46 |
| 3,893,918 | 7/1975 | Favret, Jr. | 210/104 X |
| 4,014,791 | 3/1977 | Tuttle | 210/540 X |
| 4,198,300 | 4/1980 | Williams | 210/170 |

OTHER PUBLICATIONS

General Process Piping Schematics, A Sketch by Engineering Specialties, Inc., Covington, La., 1 p. Admitted Prior Art.
Offshore Pollution Control Applications (Deck Drains, Produced Water, Sand Disposal).
Induced Air Flotation—High Performance Separators. Monarch Separators, Inc.
How to Size Offshore Waste Water Separators, World Oil, 1968.
Revised Outer Continental Shelf Orders Governing Oil and Gas Base Operations.
OCS Order No. 7 Pollution and Waste Disposal.
Oil & Gas Journal, Separator Hydraulics–Tracer–Response Studies Can Pinpoint Separator Problems, 1977.

*Primary Examiner*—John Adee

[57] ABSTRACT

A deck drainage system for removing oil containing fluid from an offshore facility includes a plurality of drains communicating with a liquid seal strainer for preventing a back flow of gas through the drain assembly. The liquid seal strainer is provided at each deck of the offshore facility with a vent provided downstream of the liquid seal strainers but upstream of a further treatment of the collected rain water and oil containing fluid. Preferably, the collected fluid is passed through a skim pile where oil is separated from the water and recovered. The clean water is then passed directly into the body of water beneath or adjacent the offshore platform. The vent located downstream of the liquid seal strainers but upstream of the skim pile preferably is provided with a flame arrestor for preventing a flash back of an inadvertent flame to the liquid seal strainer. Preferably, each of the drains is also provided with a seal arrangment so as to provide an additional protection against the flow of harmful gases back through the drainage system to the various decks.

13 Claims, 19 Drawing Figures

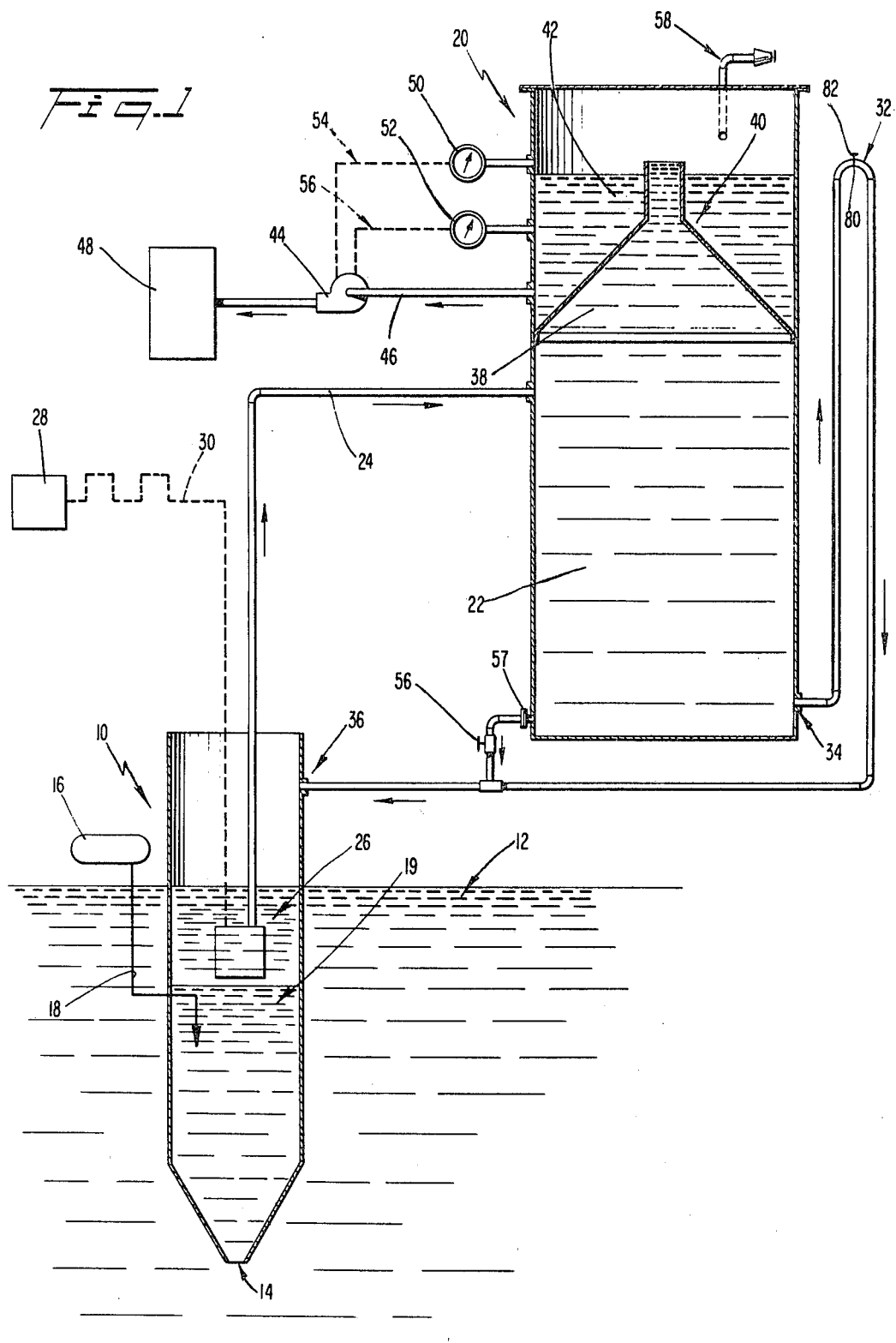

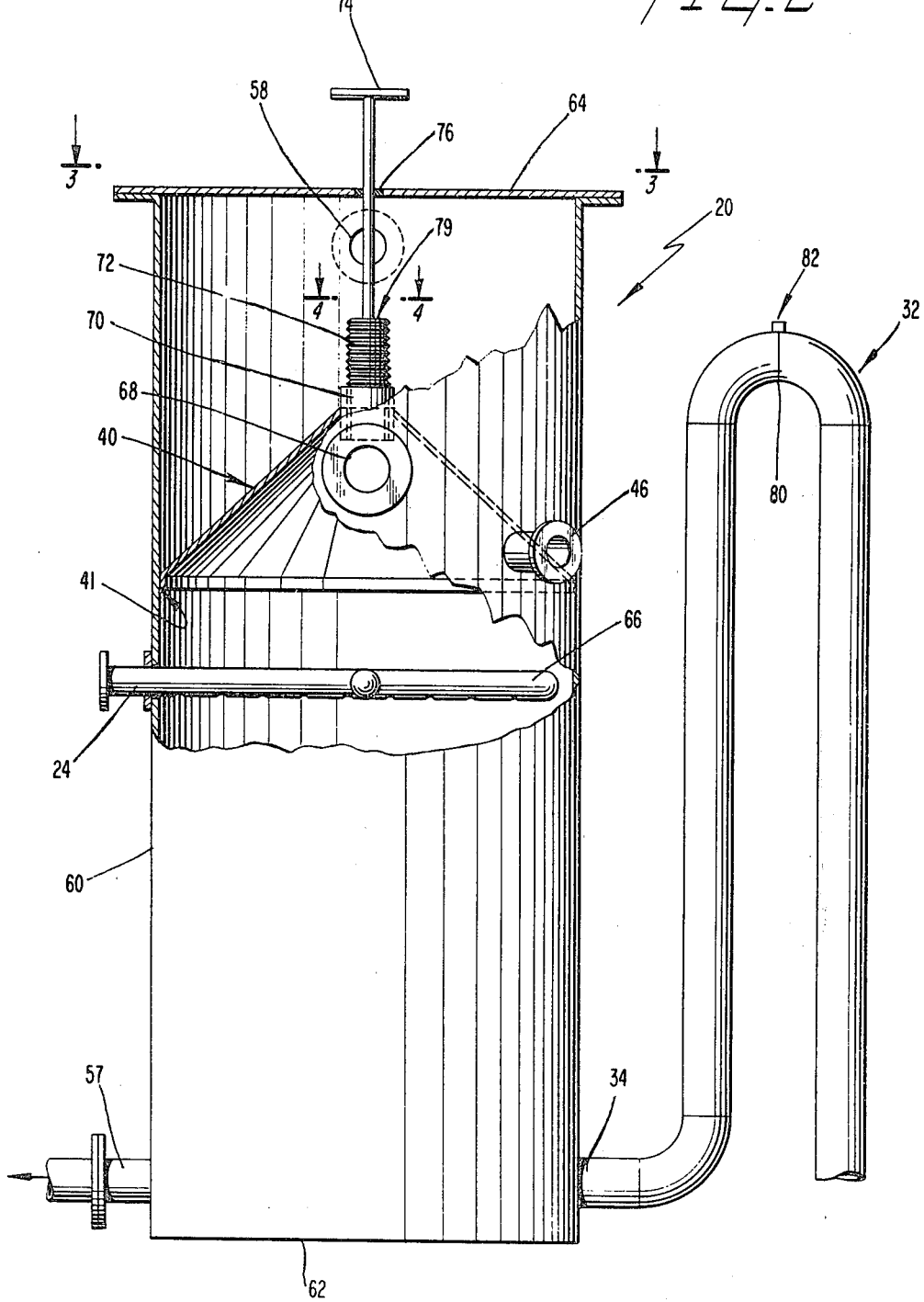

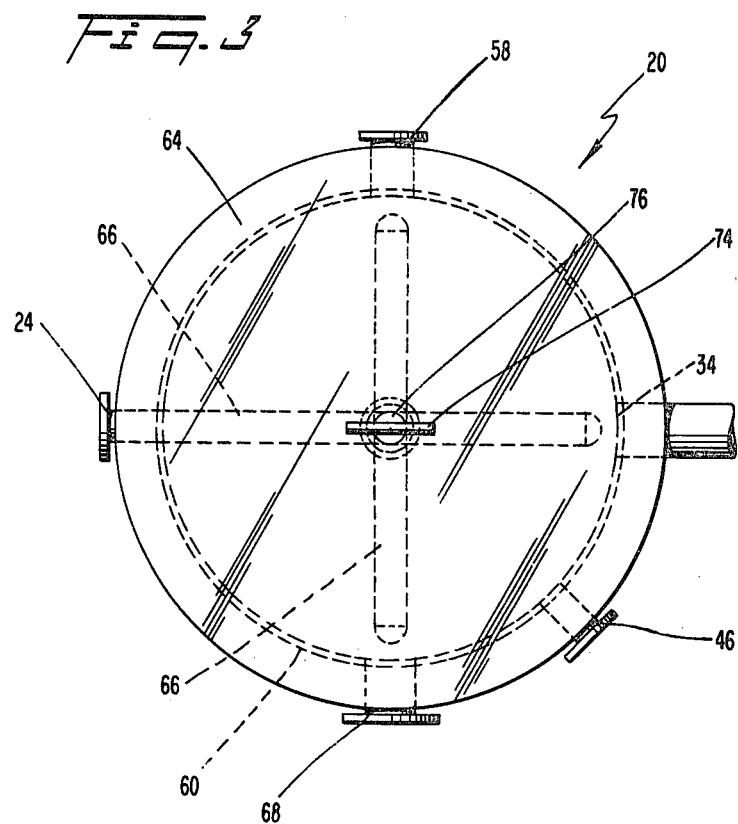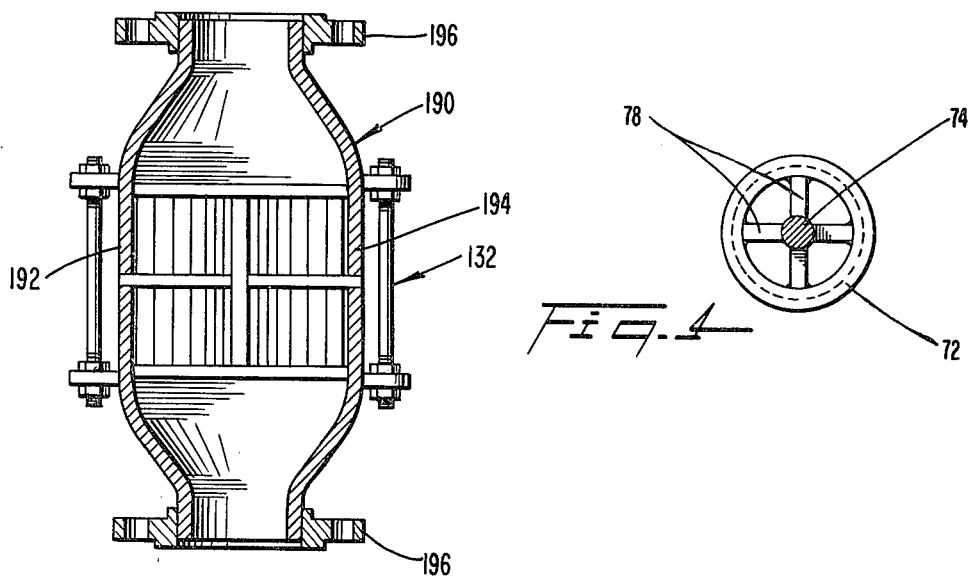

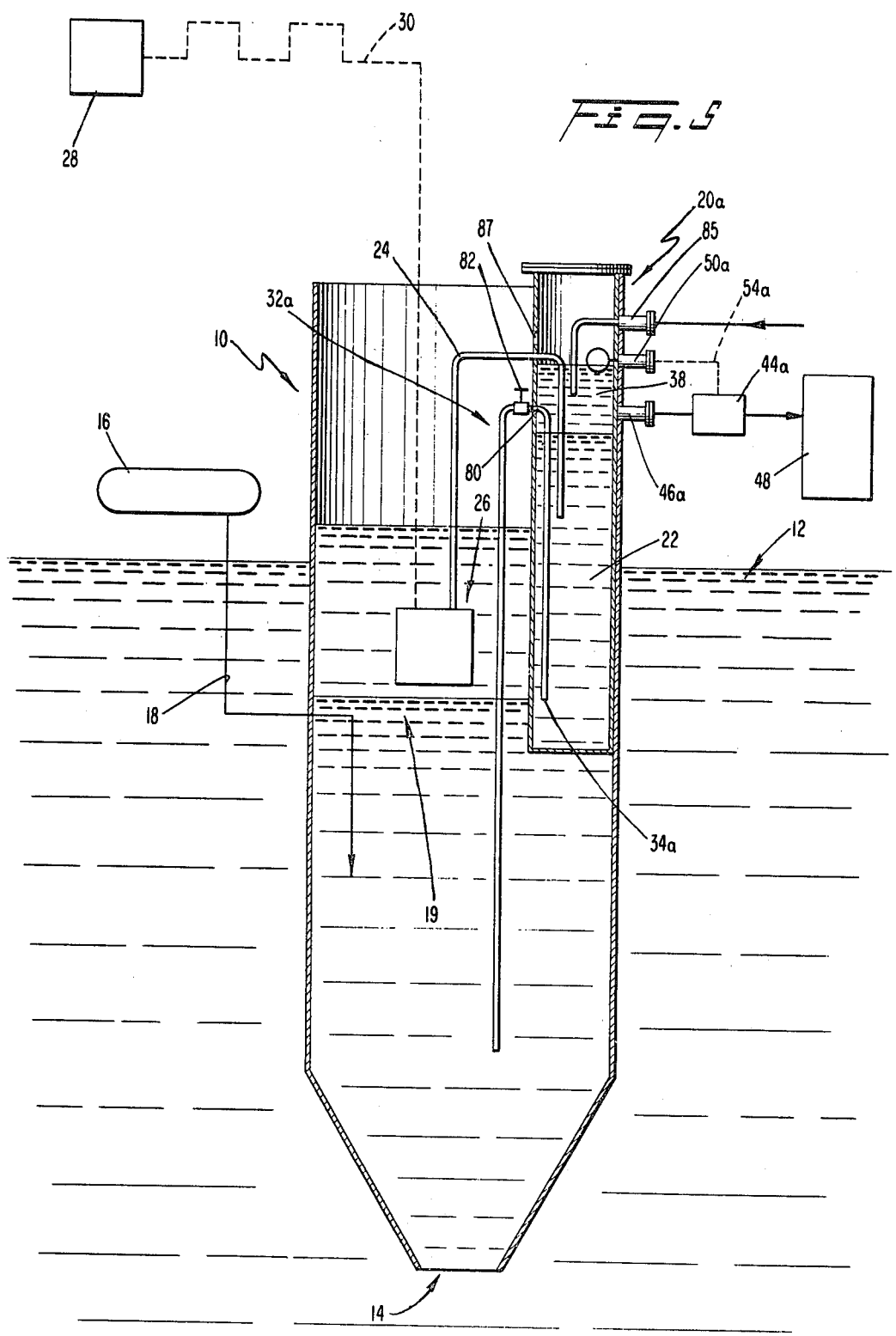

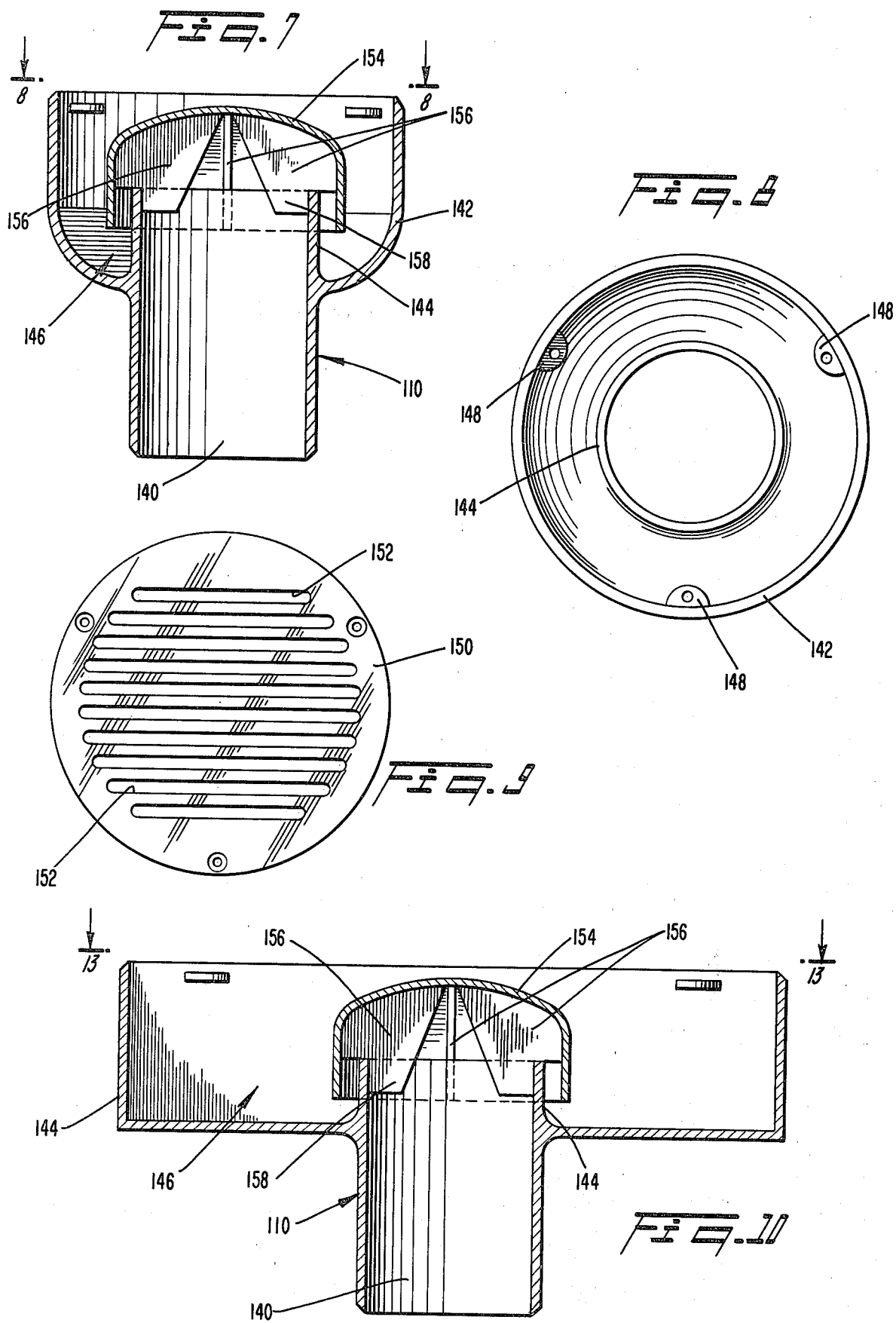

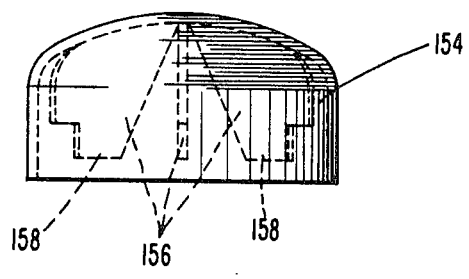
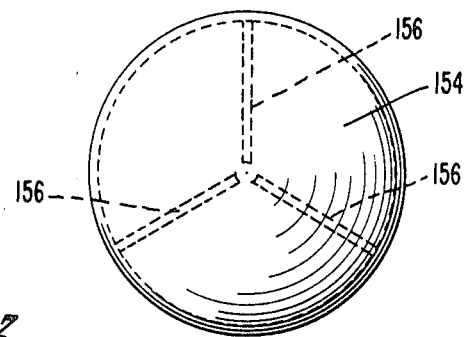
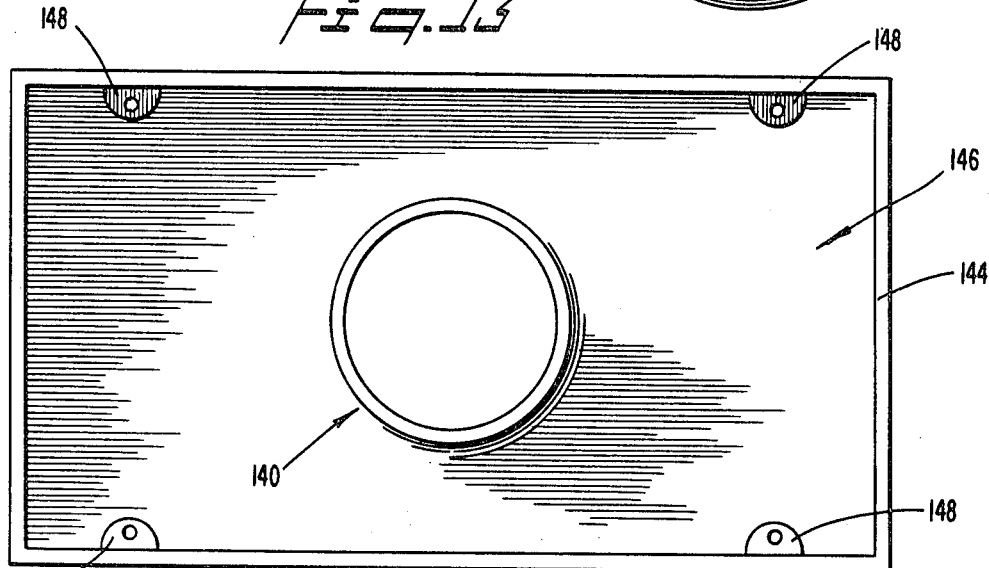
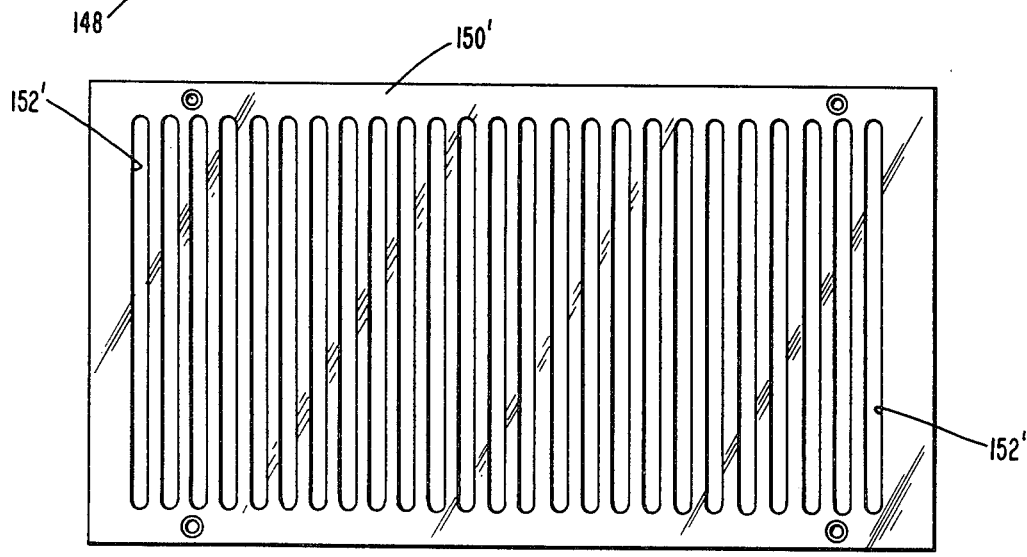

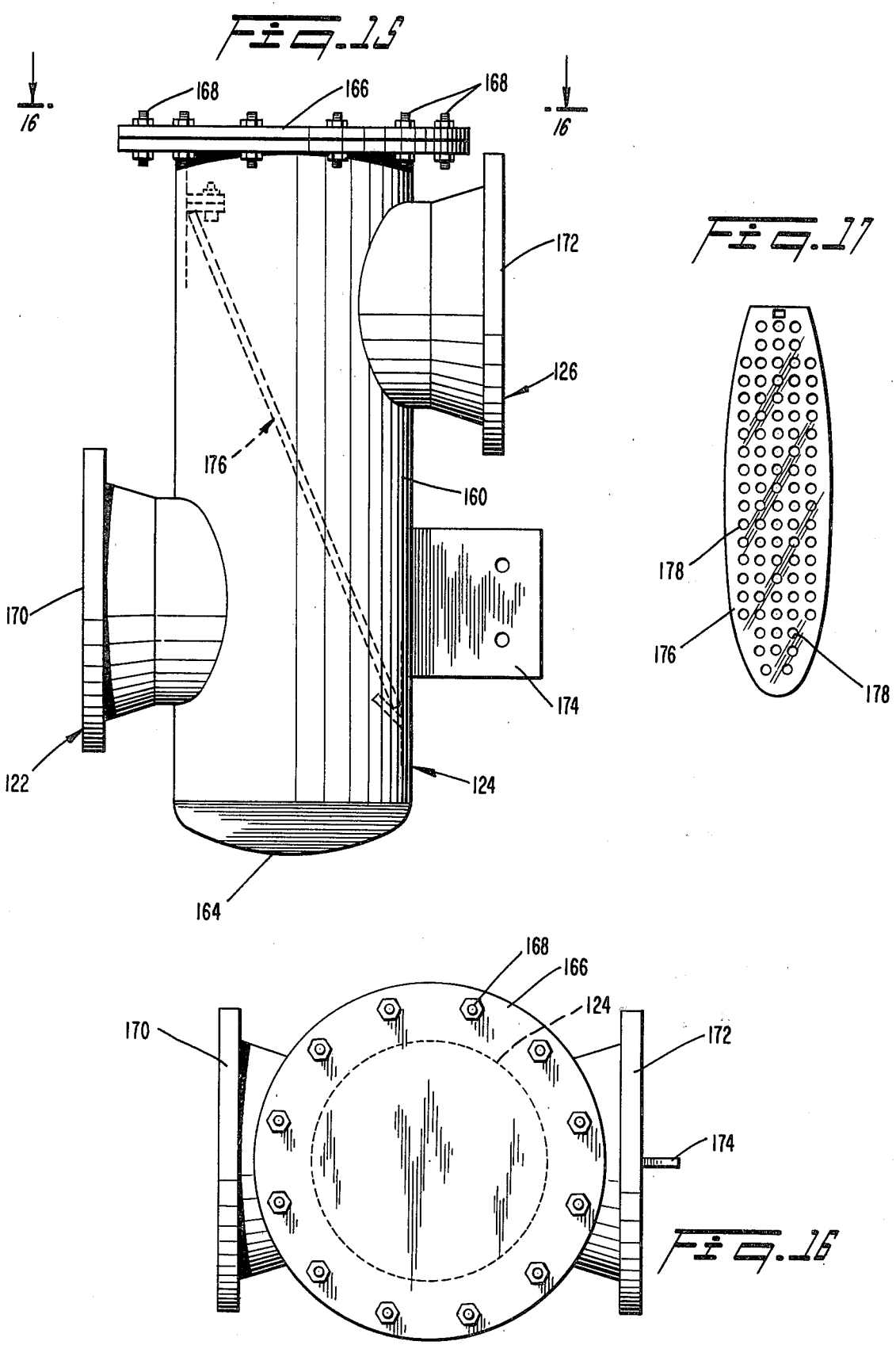

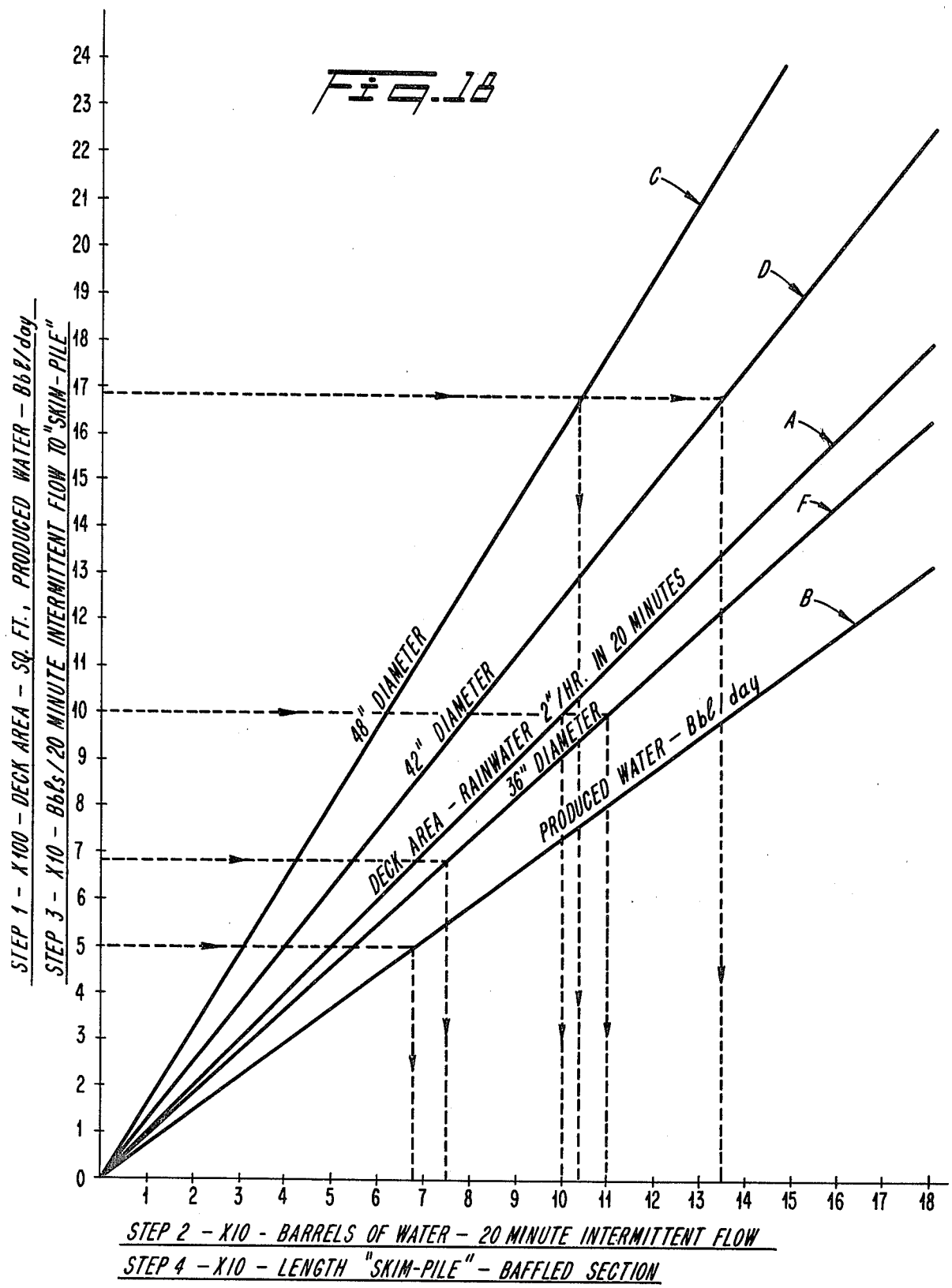

OFFSHORE PLATFORM DECK DRAINAGE

BACKGROUND OF THE INVENTION

This invention relates to deck drainage in offshore oil platforms and the recovery of oil from an oil containing fluid mixture collected by the deck drains. In particular, this invention relates to such deck drainage and oil recovery at an oil and/or gas processing facility located adjacent to a body of water, and to the disposal of the relatively oil-free fluid into the body of water.

It is conventional in oil and/or gas drilling and production to collect rainwater and miscellaneous fluids such as oils and greases for example from the decks of an offshore platform. Typically, a plurality of drains are arranged throughout one or more decks of the offshore platform, especially on portions of the decks which are open and therefore exposed to the weather. Since the rainwater washes any spilled oil or grease off of the deck and into the drains, the rainwater cannot be passed directly into the body of water beneath the platform. Instead, the collected rainwater must be treated so as to separate the oil from the water until the percentage of oil in the water reaches an acceptable level. Typically, (as the governing country's ordinances permit) as little as 30 ppm of oil is permitted in the water to be returned to the body of water beneath the platform.

Sometimes, the recovery of the oil present in the collected water is economically worthwhile because of the value of the recovered oil. Both for pollution prevention and for economical reasons, it has been conventional to supply collected rainwater and oils from the decks of an offshore platform to a "Skim Pile" (hereafter skim pile) or elongate separator conduit of Engineering Specialties, Inc. Covington, La. such as is described in U.S. Pat. No. 3,893,918.

In U.S. Pat. No. 3,893,918, issued July 8, 1975, there are disclosed skim piles or elongate separator conduits that are useful and efficient in such recovery and disposal operations. The length of the conduit and the operating procedures are such that the rising velocity of the oil in the mixture results (during an intermittent flow procedure) in the establishment of a predictable upper oil layer in the conduit.

One of the skim piles disclosed in that patent operates while in continuous communication with the body of water. As such, the total fluid level in the skim pile is responsive to tidal changes in the mean level of the water body. Provision is made for withdrawing oil from the oil layer on top of the total fluid column in response to sensing of the level of the interface between such oil layer and the remaining fluid column therebelow. In that fashion, one seeks to insure that only an oil rich mixture is withdrawn from the skim pile. Although that technique has proved quite acceptable, some difficulties have been encountered especially in situations where unpredictably large or erratic total fluid level changes are produced in response to changes in the mean level of the body of water.

U.S. Pat. No. 3,893,918 also discloses a form of skim pile where the level of total fluid in the skim pile is basically isolated from changes in the mean level of the water body through the use of a valve. Problems associated with changes in that mean water level are thereby avoided. Such skim piles are normally employed only in shallow water situations where the underwater extent of the skim pile, if it were open at the bottom, would not normally be great enough to allow for good separation of oil (as governed by the sizing charts). This is because the terminal rising velocity of the oil would not sufficiently overcome the exit velocity of downward flow in the conduit (during the periods of intermittent flow). Although normally closed and valved skim piles could be employed in deeper water situations, operational and maintenance difficulties could become prominent by reason of the need to control a valve positioned at great depth.

In a conventionally known arrangement for collecting rainwater and oil containing liquids from one or more decks of an offshore platform facility, a liquid seal strainer is provided immediately upstream of the inlet of the skim pile with all of the deck drains supplying the collected fluids to the liquid seal strainer and then immediately into the skim pile.

Such an arrangement is objectionable, however, because the deck drains of different decks may be in communication with one another. Harmful gases which oftentimes accompany the collected rainwater and oil mixture from one deck could then be transferred inadvertently to another deck.

In the known deck drain assemblies, no provision was made for removing the harmful gases from the drainage system but instead, both the liquid and gaseous components of the collected fluid were supplied to the skim pile. Since the skim pile is usually located lower than the deck drains, the gas must therefor be forced downwardly against gravity with the result that the gas has a tendency to remain trapped in the drainage system in an undesirable manner.

Still further, since such gases which may be present in the collected rainwater and oil are very often highly flammable, the possibility of an explosion is ever present. Even though the skim pile is provided with a vent to atmosphere, the danger resulting from the harmful and flammable gases is increased since the gases are detained within the drainage system until they reach the skim pile and since the gases are passed perhaps from the top deck of the platform down to the boat deck of the platform where an explosion of the gas could likely result in greater damage both to the platform and to the crew.

OBJECTS AND SUMMARY OF PREFERRED FORMS OF THE INVENTION

It is a general object of the present invention to provide a deck drainage and an oil recovery method and apparatus that obviates or minimizes problems of the sort previously noted.

Another object of the present invention is to provide a novel, efficient method and apparatus for collecting rainwater and oil-containing fluids and for recovering oil from the oil containing fluids at an oil and/or gas processing offshore facility and disposing of the relatively oil-free fluid into an adjacent body of water.

It is a particular object of the present invention to provide a novel collection and recovery method and apparatus employing individual sealing of each deck of an offshore platform facility.

It is another object of the present invention to provide a novel collection and recovery method and apparatus employing a vent stack and flame arrestor whereby flammable and harmful gases may be safely and easily eliminated from the oil containing fluids.

A preferred form of apparatus for removing an oil-containing fluid for example an offshore facility according to the present invention includes a first plurality of drains which are arranged for collecting the oil-containing fluid from a deck of the offshore facility. A backflow of gas through a conduit is prevented by a liquid seal having an inlet and an outlet. The liquid seal is connected to the first plurality of drains by way of the conduit with the oil-containing fluid from the first plurality of drains passing through the seal. The oil containing fluid is then received for further handling or treatment for example by a skim pile such as is disclosed in U.S. Pat. No. 3,893,918. Between the liquid seal and the skim pile (or further treatment of the oil-containing fluid) is a vent in communication with the atmosphere for venting the oil-containing fluid with the vent communicating with the outlet of the liquid seal.

Preferably, however, the vent is provided with a flame arrestor so as to prevent an inadvertent ignition of the flammable gas leaving the vent from flashing back from the vent to the outlet of the liquid seal.

If the oil containing fluid is to be collected from more than one deck, the drains of a first deck are connected together in parallel with the liquid collected by the drains of the first deck passing through a first liquid seal. The first liquid seal preferably includes a strainer or another screen passageway arrangement so as to prevent solid material larger than a predetermined size from passing through the liquid seal strainer. Like the drains of the first deck, the drains of a second deck are connected in parallel so as to supply the collected fluid to a second liquid seal strainer with the first and second liquid seals supplying the collected fluid to a common passageway connected, for example, to a skim pile. Between the first and second liquid seal strainers and the skim pile, however, the conduit for supplying the fluid is provided with a vent to atmosphere and preferably also with a flame arrestor to prevent flashback.

Preferably, each of the drains of the one or more decks of the collection system is provided with a sealing arrangement so as to prevent a flow of gas back through the drain to the deck. These seals at the drain are preferably in addition to the liquid seal strainer which isolates the plurality of drains of, for example, an entire deck. In this way, it is necessary for both the liquid seal (strainer) and the seal of the particular deck drain to fail before harmful and flammable gas can back flow through the drainage system to the deck.

Preferably, the skim pile is arranged vertically lower than both the drains of each deck and the liquid seal strainer associated with the drains of each deck.

BRIEF DESCRIPTION OF THE DRAWINGS

Further details and advantages of preferred forms of the invention will become apparent from the subsequent detailed description, with reference to the accompanying drawings, where like reference characters indicate like elements, and in which:

FIG. 1 is a schematic elevational view of a preferred form of oil recovery apparatus;

FIG. 2 is an elevational view, partially in section, depicting a settling tank assembly in accordance with the preferred oil recovery apparatus of FIG. 1;

FIG. 3 is a top plan view of the settling tank assembly of FIG. 1;

FIG. 4 is a sectional view of the adjustable outlet from the internal weir of the settling tank tubes along line 4—4 of FIG. 2;

FIG. 5 is a schematic elevational view similar to FIG. 1 but wherein the skimmer assembly is mounted within the skim pile;

FIG. 7 is a side cross sectional view of a preferred deck drain of FIG. 6;

FIG. 8 is a view through the line 8—8 of FIG. 7;

FIG. 9 is a top view of the coverplate of the deck drain of FIG. 7;

FIG. 10 is a side cross sectional view of an alternative deck drain of FIG. 6.

FIG. 11 is a side view of the cap of the deckdrain of FIG. 7 and FIG. 10;

FIG. 12 is a top view of the cap of FIG. 11;

FIG. 13 is a view through the line 13—13 of FIG. 10;

FIG. 14 is a top view of the coverplate of the deck drain of FIG. 10;

FIG. 15 is a side view of the liquid seal strainer of FIG. 6;

FIG. 16 is a view through the line 16—16 of FIG. 15;

FIG. 17 is a top view of the strainer FIG. 15;

FIG. 18 is a graphical computation aid; and

FIG. 19 is a side cross sectional view of a preferred flame arrestor of FIG. 6.

DETAILED DESCRIPTION

Figure 6:
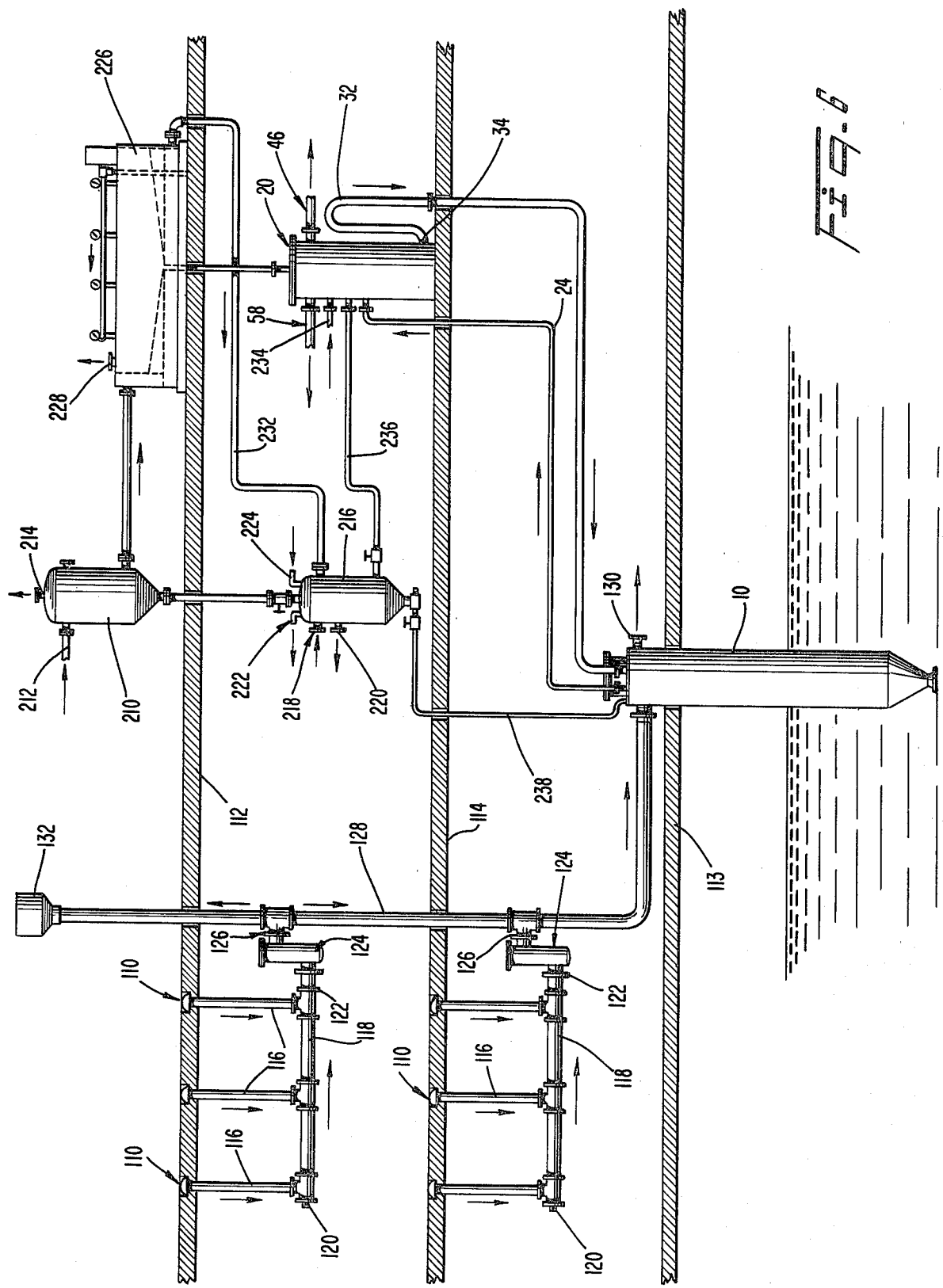
FIG. 6 is a side view in schematic form of a deck drainage system for an offshore platform facility according to the present invention.

From FIG. 1, one basic structure and method for recovering oil may be understood, which structure and method is disclosed and claimed in applicant's copending application Ser. No. 83,278 filed on Oct. 10, 1979 which is a continuation-in-part of application Ser. No. 15,468 filed on Feb. 26, 1979. Both application Ser. No. 83,278 and application Ser. No. 15,468 are hereby incorporated by reference.

An elongate, open bottom separator conduit, or skim pile 10 is disposed in a generally upwardly extending posture in a body of water 12 adjacent an oil and/or gas production facility. The open bottom 14 of the skim pile establishes an exit zone in continuous communication with the water body.

An oil containing fluid mixture is supplied to the skim pile 10 from a suitable source 16, through supply conduits, schematically indicated at 18. The mixture so supplied may eminate from skid drains or other sources associated, for example, with an offshore drilling and/or production operation. In any event, the manner of supply of the mixture is sufficient to permit oil to rise to the upper region 19 of the fluid column within the skim pile 10. This establishes an upper layer of oil on that fluid column.

Preferably the structure of the open ended skim pile 10 and the fluid mixture supply equipment associated therewith, as well as the operation thereof, is essentially identical to that described in U.S. Pat. No. 3,893,918, the disclosure of which is hereby incorporated by reference. It will, however, be appreciated that other forms of separator conduits and other operational techniques may be employed, while still realizing the benefits of the present invention.

The skim pile 10 is interconnected with a settling tank assembly or skimmer vessel 20 (preferably the High Efficiency Skimmer Vessel of Engineering Specialties, Inc.), where a head of fluid 22 is established and maintained at a level independent of the level of the water body 12. Any convenient location for the settling tank assembly 20 will suffice, for example, on a drilling and- /or production platform (not shown in FIG. 1 but see also FIG. 6) where the source fluid supplied to the skim pile 10 eminates. Alternatively, the settling tank assembly 20 may be suspended from or mounted on the portion of the skim pile 10 which projects well above the water body 12. As will also become apparent, the settling tank assembly or skimmer vessel 20 may even be mounted within the skim pile 12 (see FIG. 5).

Fluid is intermittently transferred from the upper region 19 of the skim pile 10 to the isolated head of fluid 22 in the settling tank assembly 20. In this connection, a transfer conduit is schematically depicted at 24 in FIG. 1. The inlet to the transfer conduit 24 is connected to a pump or blowcase 26 disposed in the fluid at the upper region 19 of the skim pile.

At many, if not most, times the fluid in this upper region will consist by and large of relatively pure oil. An interface control system, such as the one described in the previously incorporated disclosure of U.S. Pat. No. 3,893,918, may even be employed to help insure that this is the case. If, however, transfer occurs at times of large or erratic total fluid level changes in the skim pile 10 (in response to changes in the mean level of the water body 12), the fluid so transferred would not be entirely suitable for immediate recovery.

The use of the interconnected settling tank assembly 20 remedies that problem without any need for concern over the accuracy or reliability of an interface control. In fact such control may, if desired, be dispensed with; and transfer of fluid to the settling tank assembly may be accomplished at intervals in any suitable manner. For example, a suitable time based intermitter 28, with or without manual override, may be used to provide a suitable control signal 30 to the pump or blowcase 26.

When a pump initiates a transfer to the skimmer vessel 20, suction from the pump withdraws the fluid from the upper region 19 of the skim pile 10. When a blowcase is used, pressure is the initiating transfer force. In this regard, a blowcase basically comprises a tube with inlet and outlet check valves. Fluid flows into the tube through the inlet check valve until the tube is filled, at which time the pressure of the internal fluid holds both check valves closed. A supply of external pressure to the outlet check valve serves to open the outlet and blow out the contents of the tube, while at the same time forcing the inlet check valve closed, all in a manner which will be readily appreciated by those skilled in the art.

The overall level of fluid in the skimmer vessel 20 depicted in FIG. 1 is maintained by a level control weir assembly schematically indicated at 32. This weir assembly 32 is essentially a generally U-shaped tube disposed in a generally vertical position. Its inlet is connected to the lower end of the settling tank, as indicated at 34, and its outlet is connected to the skim pile, as indicated at 36. Thus, when fluid is transferred to the settling tank, excess fluid above the level maintained by the weir refluxes back to the skim pile.

In this connection, the inlet 34 to the level control weir 32 is disposed at the lower end of the skimmer vessel so that the most relatively oil-free fluid is refluxed, while the oil-rich fluid remains to undergo separation within the skimmer vessel during periods when the total fluid therewithin is basically at rest. This oil rises toward the top of the skimmer vessel to establish an upper oil layer 38 therewithin.

This upper oil layer 38 is surrounded by an open-ended, generally conical barrier 40 that forms a portion of the skimmer vessel and establishes a separating weir. In a manner more fully described below, rising oil spills over the separating weir 40, and the spillover oil 42 is isolated from the established head of fluid 22.

The isolated oil so recovered may be transported to any desired location in any suitable manner. For example, a pump 44 may be employed to withdraw oil through an outlet conduit 46 and deliver the oil into the main system 48 associated with the oil handling facility.

Preferably, withdrawal of oil by the pump 44 is controlled through conventional high and low level sensors 50 and 52. These sensors communicate with the zone reserved for spillover oil 42 and provide initiation and termination signals 54 and 56 to the pump 44.

Solids such as sand which deposit at the bottom of the skimmer vessel may also be removed and refluxed. For this purpose a valve 56, located at the bottom of the skimmer vessel, permits emptying of the solids into the conduit which carries the reflux fluid that exits through the level control weir 32. The valve may be manually operated or automatically controlled in any suitable manner.

While the settling tank assembly or skimmer vessel 20 heretofore described employs the level control weir 32 to maintain fluid level and to permit reflux, it will be appreciated that other structures may be alternatively utilized. In this regard, the level control weir 32 may be dispensed with and both the fluid level of the settling tank and refluxing may be entirely controlled by the valved outlet 56 from the bottom of the tank which directly feeds back to the skim pile 10. Of course, this arrangement would necessitate insuring that the valve 56 is controlled in a manner which would avoid overfilling the skimmer vessel, and the atmospheric vent 58 shown in FIG. 1 would be deleted. The separating weir 40 could, however, be retained.

FIGS. 2–4 depict further details of the separating weir 40 as well as other portions of the skimmer vessel 20.

The basic skimmer vessel structure is comprised of a generally cylindrical vessel 60 with a closed bottom 62 and a cover plate 64. All fluid transfer to and from the vessel 60 occurs through the cylindrical sidewall.

The transfer conduit 24 which brings fluid from the skim pile terminates in a distribution header 66 internally of the vessel at a level slightly beneath the separating weir 40. The vessel outlet which constitutes the inlet 34 to the level control weir 32 is located near the bottom of the vessel, as is a fitting 57 for the valved outlet 56.

Slightly above the level at which the conical separating weir 40 joins the cylindrical sidewall 60 to which it is welded (as indicated at 41), the outlet 46 for the spillover oil is located. Thereabove, a fitting 68 associated with the high and low level spillover oil sensors 50 and 52 (not shown in FIG. 2) is positioned. Near the top of the vessel 60, the atmospheric vent 58 is disposed.

The uppermost open end of the conical weir 40 includes a cylindrical sleeve 70 which is internally threaded. Adjustably threadably received within the sleeve is an externally threaded, open-ended tube 72 which forms a continuation of the weir.

Adjustment of the tube 72 is accomplished by the turning of a T-shaped bar 74 that projects into the vessel 60 through a packing gland 76 in the cover plate 64. The lower end of the bar 74 is welded to a cross web assembly 78 located internally of the tube 72 (see FIG. 4). As will be appreciated, through adjustment of the sleeve, the level at which spillover occurs can be finely adjusted.

In operation, the level control weir 32 maintains an established level of fluid in the vessel 60 and provides for refluxing of excess fluid. Siphoning of the vessel contents is prevented by a siphon breaker 82 of conventional construction which is located at the curved or transition section 80 of the level control weir.

Oil within the vessel 60 rises toward the top where it forms a layer. The conical separating weir 40 restricts the upper oil layer and tends to maximize the height thereof for a given volume. Thus, an oil rich top portion of the layer is insured and the oil-water interface is reduced to further minimize the possibility of water contamination.

The adjustable tube 72 which forms a continuation of the separating weir 40 allows for adjustment of the height at which spillover occurs. Because of the manometer effect resulting from the interconnection between the vessel 60 and the level control weir 32, the level inside the vessel 60 will tend toward a height greater than the fluid level in the level control weir 32 (see FIG. 1). This is because the density of the oil at the top of the fluid in the vessel 60 is less than the density of the fluid in the level control weir. Thus, the resulting force balance required in the manometer effect cannot take place unless the total fluid in the vessel (including the lighter upper oil layer) is higher than the fluid in the level control weir 32 when the system is at rest.

Therefore, if the outlet 79 (see FIG. 2) of the adjustable tube 72 is maintained slightly above the high point of the level control weir 32, the manometer effect will produce spillover. Of course, spillover could occur if the outlet 79 is located below the high point of the level control weir 32, but this could ultimately result in water spilling over.

Accordingly, the outlet 79 is adjustable within limits between the low point of the transition section 80 of the level control weir and a location slightly above the high point of that transition section 80. In intermediate positions the natural spillover from the manometer effect will take place, as will a forced spillover that results from fluctuations in fluid level in the level control weir, which fluctuations are produced between times of refluxing and times of rest.

In the embodiment of the invention depicted in FIG. 5, a skimmer assembly 20a is physically mounted within the skim pile 10. For ultimate oil withdrawal by a pump 44a conduit 46a also thus passes through the skim pile sidewall. If desired, some relatively oil-rich fluid which is to undergo separation may be introduced directly into the skimmer assembly 20a from some suitable source through a conduit indicated at 85.

Generally, the skimmer assembly 20a is similar in structure and function to the skimmer vessel 20 already described, and further detailed description is unnecessary. However, it should be noted that the separating weir has not been illustrated in conjunction with FIG. 5. Although it may be employed, if desired, it is not normally quite as justified where, as in the case of FIG. 5, the skimmer assembly 20a is itself conveniently structured with a greater length and a smaller diameter that aids in producing a relatively deep oil layer 38 at the top of the fluid column 22.

It will also be apparent that the level control weir 32a is depicted as having at least one leg physically within the skimmer vessel 20a. Nevertheless its function is similar to that of the level control weir 32 previously described in that it establishes and maintains a desired total fluid level and refluxes excess fluid. In this latter connection, the inlet 34a to the weir 32a is disposed near the bottom of the skimmer assembly so that fluid with the least amount of oil is to be refluxed. The siphon breaker 82, of course, prevents emptying of the skimmer vessel contents below the desired level.

Because of the relatively small diameter of the skimmer vessel 20a the system hydraulics are such that the upper oil layer 38 of total fluid will normally extend considerably above the uppermost transition section 80 of the level control weir 32a. A high level oil spillover opening 82 may be provided in the skimmer vessel so that if the level gets too high, oil will spillover into the basically oil-rich layer 19 in the skim pile 10.

Withdrawal of oil from the skimmer assembly 20a by the pump 44a may be controlled by any suitable level control device 50a disposed at which provides appropriate control signals 54a.

With reference now to FIG. 6, a deckdrain assembly for collecting rain water and oil containing fluid for example at an offshore oil and/or gas production facility includes a plurality of deck drains 110 arranged variously about one or more decks of the facility. Typically, a plurality of deck drains are provided about portions of a top deck 112 which are exposed to rain or other sources of water. Similarly, a cellar deck 114 of the offshore facility is typically provided with a plurality of deck drains 110 arranged both in exposed portions of the cellar deck and also perhaps at interior portions of the cellar deck where an accumulation of water is expected.

Each of the deck drains 110 of each deck, is in fluid communication with a down spout 116 which empties into a generally horizontal conduit system 118. Preferably, the plurality of down spouts 116 of each deck are connected in parallel to the respective horizontal passageway 118 with the horizontal passageway 118 having a sufficient inclination so as to drain the fluid from the connected down spouts 116. As desired, a clean out port 120 may be provided at an end of each horizontal passageway 118 so as to permit the periodic cleaning of the passageway and the removal of obstructions which may occur in the passageway 118.

It is expected that the down spouts 116 may be provided with a diameter of about 4 inches and that the generally horizontal passageway 118 should have a drop of about one inch for each 10 feet of horizontal extent to provide a sufficient inclination. The down spout or vent stack 128 preferably has an 8 inch diameter and extends well above the top deck of the facility.

Each of the horizontal passageways 118 is connected to an inlet 122 of a liquid seal strainer 124 (see also FIG. 15). The liquid seal strainer has an outlet 126 which is vertically higher than the inlet 122 with the result that the liquid seal strainer and the horizontal passageway 118 are generally completely filled with liquid up to the level of the outlet 126. Depending upon the inclination of the passageway 118, either the entire passageway 118 or only a portion of the passageway 118 may be supplied with liquid at any particular time. The outlet 126 of each of the liquid seal strainers communicates with a stack pipe 128 to supply the collected drain water and oil-containing fluids to a skim pile 10 as discussed above.

In the skim pile 10, the collected rain water and oil-containing fluid is separated into oil and relatively clean water along with the liberation of gas provided within the fluid. The gas vents to atmosphere from the skim pile through a vent 130 which may include a flame arrestor (not shown) with the recovered oil conveyed to the high efficiency skimmer vessel through the conduit at 24 (see FIG. 1). The relatively clean water is returned from the high efficiency skimmer vessel 20 from the outlet 34 to the inlet of the skim pile 36 by way of the passageway 32.

The vent stack 128 is provided with a flame arrestor 132 at an outlet of the vent stack 128 which permits a gaseous portion of the fluid collected by the deck drains 110 and passed through the liquid seal strainers 126 to vent to atmosphere without first being passed through the skim pile 10. The vent stack 128 also serves as a siphon break for the deck drainage system.

In this way, the gaseous portion of the collected fluids which passes through the vent 132 need not be forced downwardly through the vent stack 128 to the skim pile. Furthermore, harmful gases which may be present within the deck drainage system are readily vented to atmosphere without being unnecessarily detained within the vent stack 128 and the skim pile 10. By providing a flame arrestor at the open end of the vent stack 128, an inadvertent ignition of the harmful and flammable gases, as by a random spark, is prevented from flashing back through the vent stack 128.

As discussed above, the skim pile 10 is preferably located below the deck drains (for example at the boat deck 113 of the offshore platform facility) so that the skim pile extends into the body of water located beneath or adjacent to the platform facility. The high efficiency skimmer vessel is preferably at a generally higher elevation than the skim pile and therefore is preferably located on the cellar deck 114 (see FIG. 6).

With continued reference to FIG. 6, the output of a three-phase separator (including a mixture of oil, water and sand) is supplied to a surge settler 210 by an inlet 212. The surge settler is provided with a vent 214 to atmosphere with a sand slurry passed vertically downwardly to a solids cleaner 216. In the surge settler, free oil and a significant percentage of the sand within the output of the three-phase separator are removed.

In the solids cleaner, free oil is removed from the sand (supplied by the surge settler 210). Oily sand from the three-phase separator can be supplied to the solids cleaner 216 through the inlet 218 with the separated oil (from the solids cleaner 216) removed by an outlet 220 to a heater treater (not shown). The solids cleaner may also be provided with a gas vent 222 to atmosphere and an inlet 224 to admit oily sand from the heater treater to the solids cleaner.

The produced water including sand (of a diameter of about 50 microns or less) is supplied horizontally to a suitable conventional water washer 226 (such as is available from U.S. Filter). The water washer includes a vent to atmosphere 228 with the recovered oil supplied vertically downwardly to the high efficiency skimmer vessel 20 by a conduit 230. Clean water for sand removal is supplied to the solids cleaner by a conduit 232.

Output from closed drains can be supplied, if desired through an inlet 234 to the high efficiency skimmer 20 and also recovered oil and water from the sand cleaning can be passed from the solids cleaner 216 by a conduit 236.

Finally, the clean sand from the solids cleaner 216 is passed vertically downwardly to the skim pile 10 by way of a conduit 238.

In this way, a complete system for collecting, treating and disposing of oil-containing fluids at an offshore facility may be provided.

With reference now to FIG. 7, a deck drain 110 preferably includes a central cylindrical passageway 140 surrounded by a dish 142 which encircles the outer periphery of the cylindrical passageway 140. The cylindrical passageway 140 preferably includes a portion 144 which extends vertically upwardly from a lower portion of the dish 142 so as to provide an annular trough 146 about the interior of the dish 142. With reference to FIG. 8, a plurality of tabs 148 are arranged about an interior periphery of the dish 142 so as to receive a plate 150 (see FIG. 9). The plate 150 is provided with a plurality of slots 152 or serrations so as to prevent particles having a size larger than the dimensions of the slots from passing into the interior of the deck drain 110.

If desired, the dish 142 may have a rectangular cross section 144 (see FIG. 10). In that case the plate 150' likewise has a rectangular cross section with the slots 152' preferably arranged crosswise with respect to a major axis of the cross sectional area. Whether the dish 142 is circular or rectangular in cross section, or of some other configuration, the extension 144 of the cylindrical passageway 140 is preferably covered by a cap 154 (see FIG. 11). The cap 154 is provided with a plurality of ribs 156 which extend radially inwardly from an outer periphery of the cap. Each of the ribs 156 is provided with a depending tab 158 which is received within an interior of the projection 144. The ribs 156 maintain the cap a preferred distance above a bottom surface of the dish 142 and likewise the tabs 158 maintain a preferred spacing between an interior wall of the cap 154 and an exterior wall of the projection 144. In this way, a continuous passageway extending through the cover plate 150 and between the interior portion of the cap and the exterior portion of the projection 144 into the interior of the cylindrical passageway 140 is provided. Since the projection 144 extends vertically upwardly with respect to the lower portion of the dish 142, liquid is typically maintained within the drain at a level corresponding to the upper most height of the projection 144. The drain has a self-sealing arrangement or configuration which prevents or greatly reduces the passage of gas from the cylindrical passageway 140 back to the atmosphere through the cover plate 150.

With reference now to FIG. 15, the liquid seal strainer 124 preferably includes a tubular cavity 160 formed of a cylindrical housing having a flange 162 at an uppermost end and a rounded end cap portion 164 at a lowermost end of the liquid seal strainer. A top plate 166 is releasably secured to the flange 162 as by bolts 168 so as to permit the removal of the plate 166 periodically for cleaning and inspection of the liquid seal strainer. The inlet 122 and the outlet 126 may likewise be provided with respective flanges 170, 172 to facilitate connection of the inlet and outlet with the immediately adjacent conduits. To facilitate mounting of the liquid seal strainer on the off-shore platform facility, a mounting bracket 174 may preferably be connected to the cylindrical housing 160 as required. To limit the passage of solid material through the liquid seal strainer, a strainer plate 176 is preferably arranged diagonally within the interior of the liquid seal strainer so as to require all of the fluid passing from the inlet 122 to the outlet 126 to pass through the strainer plate 176. Preferably, the strainer plate is provide with a plurality of bores or passageways 178 of a cross sectional diameter corresponding to the preferred maximum size of the solid material passing through the strainer.

With reference to FIG. 19, a suitable conventional flame arrestor 132 such as Model 7618 of Groth Equipment Corporation, Houston, Tex. includes a generally cylindrical housing 190 provided with an expanded middle portion 192 which includes an internal wafer configuration 194. The flame arrestor is itself of conventional design and is used variously in both offshore and inland oil production facilities to prevent or inhibit flame propagation in gas piping systems. The flame arrestor 132 is preferably provided with at least one flange 196 so as to facilitate attachment of the flame arrestor to an end of the vent stack 128 (see FIG. 6).

With reference now to FIG. 18, the computation of a preferred diameter for the skim pile 10 may be computed as follows:

Assume for example that the drained deck area of the offshore facility includes 10,000 (ten thousand) square feet and that the water produced, for example, by a three phase separator from the oil and/or gas production is 5000 barrels per day. Locating 10,000 square feet on the x-axis and reading the corresponding value on the y-axis, one obtains a figure of 100 barrels assuming a maximum rain water of 2 inches per hour in twenty minutes (see diagonal A of FIG. 18). Similarly, locating a produced water value of 5000 barrels per day on the x-axis results in a corresponding value of 68 barrels for the produced water (see diagonal B of FIG. 18) assuming a twenty minute intermediate flow for the skim pile. Diagonals for other expected maximum amounts of rainwater, etc. could be easily provided on the computational aid by those skilled in the art upon reading the present specification.

Therefore, the total water to be handled by the skim pile is equal to 100 barrels plus 68 barrels for each twenty minute intermediate flow based on the maximum load on the skim pile resulting from produced water and from the maximum assumed level of rain water of two inches per hour in twenty minutes. Entering the value of 168 barrels on the x-axis results in a corresponding length of a 48 inch diameter skim pile (see diagonal C of FIG. 18) of 104 feet and a corresponding length of a 42 inch diameter skim pile (see diagonal D of FIG. 18) of 135 feet. If a 36 inch diameter skim pile (see diagonal E of FIG. 18) is to be utilized, the required length equals 110 feet plus 75 feet equal to 185 feet of length which is obtained by entering the value of 100 feet on the x axis and reading the corresponding value and likewise entering the value of 68 barrels on the x axis and reading the corresponding value for the 36 inch diameter skim pile. Using this graph, the minimum length of skim pile which is suitable for accommodating the expected maximum volume of produced water and the expected maximum volume of rain water for two inch per hour operation in twenty minutes can be obtained.

In operation, the rainwater and oil containing fluids which occur at the top deck and cellar deck for example of an offshore platform facility are collected by the drains provided for each deck of the facility with the fluid supplied through a common passageway to an inlet of a seal. The seal prevents a backflow of gas through the various drains of each system with the plurality of seals supplying the fluid to a common vent stack for supply for example to a skim pile where the oil may be separated or recovered from the rain water. Downstream of the seal, harmful and flammable gases are vented through a vent stack communicating with the atmosphere. Preferably, a flame arrestor is configured so as to prevent a flashback of an inadvertent flame into the vent stack.

Although the present invention has been described in connection with preferred forms thereof it will be appreciated that additions, modifications, substitutions and deletions may be made without departing from the spirit and scope of the invention.

What is claimed is:

1. Apparatus for removing oil-containing fluid from an offshore facility, comprising
   deck drain means for collecting said oil-containing fluid from a deck of said offshore facility, said deck drain means including at least a first plurality of deck drains;
   receiving means for receiving said oil-containing fluid from said first plurality of deck drains of said deck drain means;
   vent means communicating with said receiving means and with said deck drain means, for venting said receiving means and for delivering oil-containing fluid collected by said deck drain means to said receiving means; and
   seal means, interposed between said vent means and said deck drain means, for preventing a back-flow of gas from said receiving means and through said vent means to said deck drain means, said seal means including an inlet in communication with said first plurality of deck drains through conduit means, and an outlet in communication with said vent means.

2. The apparatus of claim 1 wherein said vent means includes a vent stack having an outlet to atmosphere, said outlet of said vent stack being located above said deck drain means.

3. The apparatus of claim 2 wherein said vent means further includes means for preventing a flash back of a flame from said outlet of the vent stack to said outlet of said seal means.

4. The apparatus of claim 1 wherein said deck drains include drain seal means for preventing a back-flow of gas from said conduit means to atmosphere through said deck drains.

5. The apparatus of claim 4 wherein said drain seal means is arranged to maintain liquid in the deck drains and wherein said conduit means includes an inclined passage to said inlet of said seal means interposed between said vent means and said deck drain means.

6. The apparatus of any one of claims 1–5 wherein said receiving means includes means for separating oil from said oil containing fluid.

7. Apparatus for removing oil-containing fluid from an offshore facility, comprising:
   a first plurality of deck drains for collecting oil-containing fluid from a first deck of said offshore facility;
   a second plurality of deck drains for collecting oil-containing fluid from a second deck of said offshore facility;
   receiving means positioned below said deck drains for receiving oil-containing fluid from said pluralities of deck drains and for separating oil from the received oil-containing fluid;
   a vent stack communicating with said receiving means and operable to vent to atmosphere through an outlet located above said pluralities of deck drains;

first conduit means interconnecting said first plurality of deck drains with said vent stack for supply of collected oil-containing fluid therethrough to said receiving means;

second conduit means interconnecting said second plurality of deck drains with said vent stack for supply of collected oil-containing fluid therethrough to said receiving means;

first conduit seal means interposed between said vent stack and said first conduit means, for preventing a back flow of gas from said vent stack to said first conduit means, while permitting flow of oil-containing fluid from said first conduit means through said vent stack to said receiving means;

second conduit seal means, interposed between said vent stack and said second conduit means, for preventing a back flow of gas from said vent stack to said second conduit means, while permitting flow of oil-containing fluid from said second conduit means through said vent stack to said receiving means; and drain seal means for each of said deck drains operable to prevent back flow of gas to atmosphere through each of said deck drains from the associated one of said first and second conduit means.

8. Apparatus of claim 7 wherein said vent stack includes means for preventing a flash back of a flame from said outlet of said vent stack to said first and second conduit seal means.

9. Apparatus of claim 7 wherein said first and second conduit seal means includes means for straining said oil-containing fluid.

10. Apparatus of anyone of claims 7-9 wherein said drain seal means is arranged to maintain liquid in the drains and wherein said first and second conduit means each include an inclined passage to said vent stack.

11. A method for removing oil-containing fluid from an offshore facility comprising the steps of:
collecting oil-containing fluid from a plurality of drains arranged about a deck of said offshore facility;

draining the collected oil-containing fluid to a vent stack which leads to and vents a separator for the oil of the oil-containing fluid, which separator is disposed below the drains, and which vent stack has an outlet to atmosphere located above the drains; and sealing against a back flow of gas from the vent stack to the drains, while permitting the flow of oil-containing fluid from the drains to the vent stack.

12. The method of claim 11 including the further step of:
sealing the drains themselves against a back flow of gas to atmosphere.

13. The method of claim 11 or claim 12 including the further step of:
preventing a flash back of flame from the vent stack outlet to the location of sealing against a back flow of gas from the vent stack.

* * * * *

UNITED STATES PATENT AND TRADEMARK OFFICE
CERTIFICATE OF CORRECTION

PATENT NO. : 4,372,757
DATED     : February 8, 1983
INVENTOR(S) : Uncas Favret, Jr.

It is certified that error appears in the above-identified patent and that said Letters Patent is hereby corrected as shown below:

On the cover page after identification of the inventor, insert

--Assignee: Engineering Specialties, Inc., Covington, Louisiana--.

Signed and Sealed this

Fourteenth Day of June 1983

[SEAL]

Attest:

DONALD J. QUIGG

Attesting Officer

Acting Commissioner of Patents and Trademarks